US011720154B2

(12) United States Patent
Stevens

(10) Patent No.: US 11,720,154 B2
(45) Date of Patent: Aug. 8, 2023

(54) ENVIRONMENTAL AND TEMPERATURE BASED COMPUTING DEVICE FAN ADJUSTMENTS

(71) Applicant: Hewlett-Packard Development Company, L.P., Spring, TX (US)

(72) Inventor: Jeffrey C. Stevens, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/419,445

(22) PCT Filed: May 21, 2019

(86) PCT No.: PCT/US2019/033329

§ 371 (c)(1),
(2) Date: Jun. 29, 2021

(87) PCT Pub. No.: WO2020/236157

PCT Pub. Date: Nov. 26, 2020

(65) Prior Publication Data

US 2022/0147128 A1 May 12, 2022

(51) Int. Cl.
*G06F 1/20* (2006.01)
*G05D 23/19* (2006.01)
*G06F 1/16* (2006.01)

(52) U.S. Cl.
CPC ......... *G06F 1/206* (2013.01); *G05D 23/1917* (2013.01); *G05D 23/1927* (2013.01); *G06F 1/1684* (2013.01)

(58) Field of Classification Search
CPC ....................................................... G06F 1/206
See application file for complete search history.

(56) References Cited

U.S. PATENT DOCUMENTS

| | | | | |
|---|---|---|---|---|
| 6,194,858 | B1 * | 2/2001 | Chen | H05K 7/20209 388/903 |
| 9,304,520 | B2 * | 4/2016 | Cheng | G05D 23/1919 |
| 9,752,811 | B2 | 9/2017 | Howell | |
| 11,182,383 | B1 * | 11/2021 | Shim | H04W 4/029 |
| 2006/0181232 | A1 * | 8/2006 | Oljaca | G06F 1/206 318/268 |
| 2007/0027580 | A1 | 2/2007 | Ligtenberg et al. | |
| 2008/0112571 | A1 | 5/2008 | Bradicich et al. | |
| 2009/0222147 | A1 * | 9/2009 | Nakashima | G06F 1/206 713/502 |
| 2011/0130891 | A1 | 6/2011 | Nielsen et al. | |
| 2011/0251733 | A1 | 10/2011 | Atkinson et al. | |
| 2016/0013745 | A1 | 1/2016 | North et al. | |
| 2017/0219240 | A1 | 8/2017 | Cassini et al. | |
| 2018/0348830 | A1 * | 12/2018 | Hou | G06F 1/206 |

FOREIGN PATENT DOCUMENTS

| | | |
|---|---|---|
| EP | 2620836 A1 | 7/2013 |

* cited by examiner

*Primary Examiner* — Suresh Suryawanshi
(74) *Attorney, Agent, or Firm* — Quarles & Brady LLP

(57) ABSTRACT

In one example in accordance with the present disclosure, a system is described. The system includes a sensor to detect an environmental condition for a computing device in which the system is disposed. A device sensor determines a temperature within the computing device. The system also includes a controller to selectively control a fan within the computing device based on the environmental condition and the temperature.

15 Claims, 8 Drawing Sheets

ENVIRONMENTAL AND TEMPERATURE BASED COMPUTING DEVICE FAN ADJUSTMENTS

BACKGROUND

Computing devices are used in a wide variety of scenarios and include a variety of components that operate to execute a wide variety of functions. For example, personal computing devices may be used in a home setting, where multiple users can generate electronic files such as text documents, images, video files, etc. These personal computing devices also allow for web browsing, a variety of other forms of electronic communications, and in general an endless list of computing functions. Computing devices may also be used in commercial settings. For examples, computers, servers, routers, and any number of other computing devices can be used to carry out the day-to-day and long-term objectives of a business or other entity.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
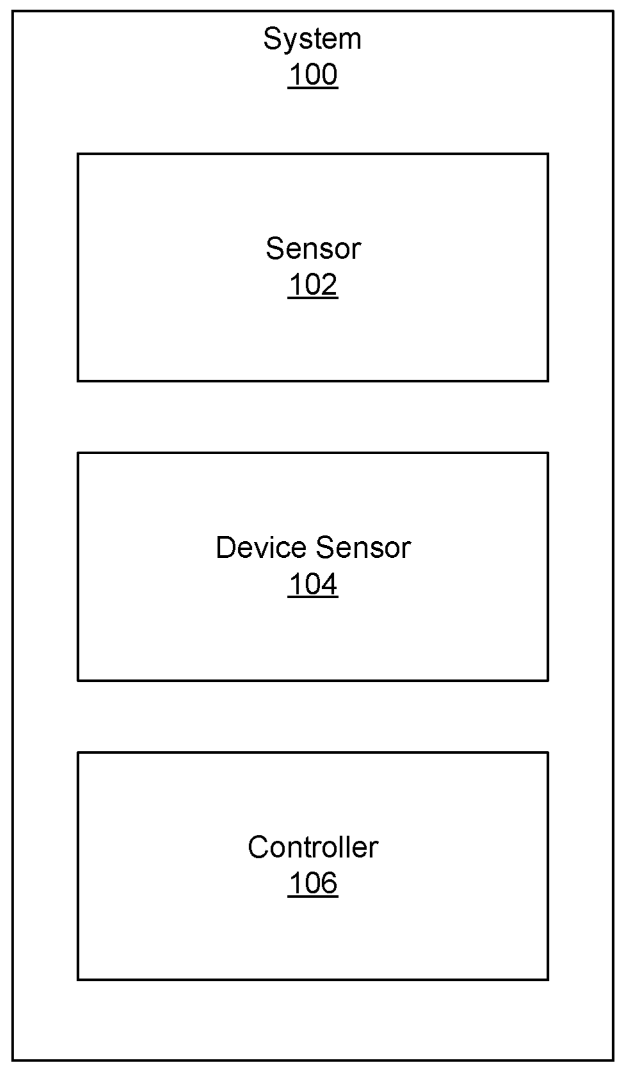
FIG. 1 is a block diagram of a system for adjusting a computing device fan based on environmental conditions and device temperature, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Computing device use in modern society is increasing at an exponential rate. That is, computing devices are playing an increased role in personal, professional, and other environments. Such computing devices include mobile phones, desktop computers, laptop computers, servers, tablet devices, gaming systems, and others. One would be hard pressed to find an individual who does not interact with any one of these devices multiple times per day.

The increased use of such devices places greater demand on the performance of the components of the computing devices. That is, in addition to being used more, consumer demand drives development for quicker, more effective, and more powerful computing components to more effectively carry out the operations of the computing devices and to enable new and more complex computing operations.

As these components operate to carry out their intended function, they generate heat, which heat generation can damage the computing components. Accordingly, computing devices may include fans that operate to cool the components within a computing device. Today's computing devices may monitor the temperature of components within the computing device and control fan-based thermal solutions to manage system performance, reliability, and acoustic characteristics. That is, temperature is a relevant factor in determining system component reliability. Component failure rates may be strongly influenced by the accumulated time over the range of operating temperatures, and reduced temperatures over time yield a longer component life.

While such fans increase computing device component longevity and reliability, some characteristics may reduce their effectiveness. That is, in some examples the fans that operate to cool the devices may be loud and disruptive in a use environment. Accordingly, to have desirable acoustic properties, the present system describes running the fans at a reduced speed at certain times when a quieter environment is desired, i.e., when there are users present who may be distracted or disrupted by the fan noise, and ramping up to higher speeds to maintain component temperatures within specified limits based on thermal metrics or when users are not present.

However, fan adjustments based solely on user presence may not effectively cool a computing device. As a specific example, if a computing device has users in front of it continually, such as on a factory floor that operates 24 hours a day, a system that turns off a fan when user presence is detected may never activate the fan due to the continual presence of users. Such a system would not adequately cool the computing components and they may fail. Other examples exist where a system that adjusts fan operation exclusively on user presence may not be effective.

Accordingly, the present specification adjusts fan operation not only on environmental conditions, but also on actual temperature conditions within the computing device and thermal metrics for the component. That is, certain criteria may indicate that a component, over a predetermined period of time such as 24 hours, cannot have an average temperature above a certain temperature. In this example, the system may reduce fan speed if a user is in front of the computing device, so long as the average temperature for this component does not rise above the threshold temperature. That is, the present specification uses thermal metrics and environmental conditions to determine how to operate cooling fans of a computing device.

Specifically, the present specification describes a system. The system includes a sensor to detect an environmental condition for a computing device in which the system is disposed. The system also includes a device sensor to determine a temperature within the computing device. The system also includes a controller to selectively control a fan within the computing device based on the environmental condition and the temperature.

The present specification also describes a method. According to the method, an environmental condition for a computing device is detected and a temperature condition for the computing device is determined. A thermal metric is extracted for the computing device. Based on the environmental condition, the temperature condition, and the thermal metric for the computing device, fan operating parameters are selected from among multiple fan operating parameters to apply to a fan within the computing device. The fan within the computing device is controlled based on selected operating parameters.

The present specification also describes a non-transitory machine-readable storage medium encoded with instructions executable by a processor. The machine-readable storage medium includes instructions to detect an environmental condition for a computing device, determine a temperature condition within the computing device, and extract a thermal metric for the computing device. Based on the environmental condition, the thermal metric for the computing device, and the temperature condition, fan operating parameters are selected from among multiple fan operating parameters across a spectrum to apply to a fan within the computing device.

Factoring user presence into the fan control allows the system to balance ideal acoustic performance with optimized product life. Allowing fans to run faster and enhance cooling when a user input, and presence, is not detected can reduce component failure rates and can extend product life without sacrificing user experience.

In some examples, through a low power sensor, the system can detect user presence, even if the system is idle or in a low power state that can prevent the fans from ramping beyond ideal acoustic levels. That is, when no user presence is detected, the thermal fans can ramp to higher levels thus maintaining lower component temperatures at times when the higher acoustic levels are permissible.

In some examples, computing devices run hottest when in an idle mode. This may be due to the fact that during idle mode, fans are run at lower speeds to conserve power, which lower speeds may be ineffective at reducing component temperature below a predetermined point. Moreover, it may be the case that certain system operations, such as system updates, renderings, etc. are running while the user is not present.

When system components can be maintained at a lower temperature, modern computing devices can take advantage of the opportunity to operate at higher performance levels until components reach elevated temperatures. At times when no user presence is detected, the higher fan speeds and enhanced system cooling can allow for more opportunities and longer periods of elevated computing performance.

Such systems and methods 1) enhance system reliability by reducing failure rates relating to high component temperatures, 2) enhance customer experience by running fans at a higher speed when a user is not present, or just to a minimal degree when a user is present to maintain predetermined component temperatures. However, it is contemplated that the devices disclosed herein may address other matters and deficiencies in a number of technical areas.

Turning now to the figures, FIG. 1 is a block diagram of a system (100) for adjusting a computing device fan based on environmental conditions and device temperature, according to an example of the principles described herein. As described above, fan adjustment may include controlling fan speeds and/or fan runtime based on environmental conditions and temperature conditions within the computing device. For example, a fan speed may be increased when no user presence is detected and may decrease when a user presence is detected. However, as described above fan control is based on more than just user presence, it is also based on thermal metrics for the computing device and actual temperature conditions within the computing device. That is, a computing device may have a prescribed average temperature which components of the computing device are to be kept under. Accordingly, even if user presence is detected, which would otherwise indicate reduced fan speeds, the fan speed may be increased if the temperature of a component, or components, of the computing device rise above this average temperature.

Accordingly, the system (100) includes a sensor (102) to detect an environmental condition for a computing device in which the system (100) is disposed. That is, the system (100) may include the hardware components depicted in FIG. 1 and may be disposed in a computing device such as a desktop computer, a laptop computer, a mobile device, a tablet device, a gaming system, or in any variety of computing devices.

The environmental conditions which are detected may vary as well. For example, the environmental condition may be a user presence in front of a computing device. Accordingly, in this example optical sensors (102) may be used to detect not only the presence of a user, but detect how many users are present.

In another example, the environmental condition may be a time of day. In this example, the sensor (102) may extract data from a calendar.

As yet another example, the environmental condition may be ambient noise around the computing device. In this example, the sensor (102) may include microphones to detect not only the existence of ambient noise, but the volume of the ambient noise. That is, the sensor (102) may detect a degree of the environmental condition, i.e., a quantity of users present and a volume of ambient noise. That is, while previous systems may adjust fan speed based on a binary output from a sensor (102), the present system (100) adjusts fan speed and/or runtime based on a more than two outputs from a sensor (102). That is fan control is based not only on whether the environmental condition exists, but a degree of the environmental condition.

In some examples, the sensor (102) is a low power sensor to operate during an idle mode and an active mode. That is, noise, user presence, etc. may be determined not only when a computing device is active but also when it is inactive. Such a low power sensor allows the controller (106) to selectively control fan during both the idle mode and the active mode.

That is, during an active mode, computing device components heat up as a user executes certain computing tasks. Accordingly, the sensors (102) in this example determine the environmental conditions and use the detected environmental conditions as an input to adjust fan speed.

However, fan control during an idle mode computing device cooling may also be advantageous. That is, as described above, the thermal metric established for a computing device may be that an average temperature over a period of time is not greater than a certain temperature. Accordingly, cooling the components during this idle time may bring down the overall average temperature of the component, such that these components may be run at a higher rate during an active mode and still maintain the average component temperature under the threshold average value.

Moreover, even though components may not be generating as much heat in an idle mode as compared to an active mode, it may still be desirable to have active cooling. This is because the components are generating heat, albeit not as much as in active mode. These components may not be cooled as much either because the fans are operating at a lower speed, which may be done to conserve power. That is, although the components are not generating as much heat, they may have a higher temperature due to the fans being run at a lower speed and not cooling the components.

Moreover, some intense computing operations may be run while the computer is in an idle mode. For example, system updates which are long and computationally intense may be run over a long period of time when a user is not present and the computing device is in an idle mode. In another example, certain computing activities such as video or 3D rendering may take multiple hours to complete, during which the computing device may be idle for a portion of that time. Accordingly, low power sensors (102) that operate during idle and active mode may allow for computing efficiency even during an idle stage for the computing device.

An example of such a low power sensor, in the example of detecting user presence is a time-of-flight, passive, infrared, or similar, sensor (102) to monitor user presence to provide input to the system (100) controller (106). In this example, when user presence is detected, the system (100) can adjust fan operation to deliver a desired acoustic performance. When no user presence is detected, the system (100) can optimize computing device performance and component temperatures. In other words, when no one is around, the controller (106) can run the fan faster to optimize the cooling solution without concern of the computing device being too loud.

The system also includes a device sensor (104) to determine a temperature within the computing device. That is, as described above, the current system (100) not only adjusts fan operation based on environmental conditions, but the temperature conditions of the computing device, thus ensuring increased longevity and product reliability. That is, in one example, even though a user is in front of a computer, which may indicate reducing fan speed to a predetermined amount, if the average temperature of a CPU over a 24 hour period is greater than a threshold amount, the controller (106) may increase the fan speed so as to bring the average temperature back under the threshold value, even if a user is in front of the computing device.

The system (100) also includes a controller (106) to selectively control at least one fan within the computing device based on the environmental condition and the thermal metric for the computing device. That is, fan operation is not based solely on environmental condition, but also whether the thermal metrics for the component(s) of the device are satisfied.

That is, in one example, even though a user is in front of a computer, which may indicate reducing fan speed to a predetermined amount, if the average temperature of a central processing unit (CPU) over a 24 hour period is greater than a threshold amount, the controller (106) may increase the fan speed so as to bring the average temperature back under the threshold value.

The device sensor (104) may be a thermostat or thermocouple that measures the temperature at a variety of locations within the computing device. For example, the device sensor (104) may indicate a temperature of a particular component such as the CPU. In another example, the device sensor (104) may indicate a temperature of another component or of the computing device in general. For example, the device sensor (104) may indicate a temperature within a housing of the computing device. This information may be used to determine fan operating parameters.

That is not to say that the user presence is not a factor at all in fan control. For example, if the average temperature within a computing device is above a thermal metric and a user is not present, the fan may be operated at a certain speed, for example 100% capacity for a period of time, for example 10 minutes to cool the component. By comparison if the average temperature within the computing device is above the thermal metric and a user is present, the fan be operated at a lower speed, for example 75% capacity for a longer period of time, for example 20 minutes. Thus, user experience is maintained by running the fan at a lower, less disruptive speed, albeit for a longer period of time, all while still allowing the fan to reduce the temperature of the computing device component(s). Thus, the present system (100) by accounting for component(s) temperatures as well as environmental conditions, balances user acoustical experience with system performance in adjusting computing device cooling systems.

Figure 2:
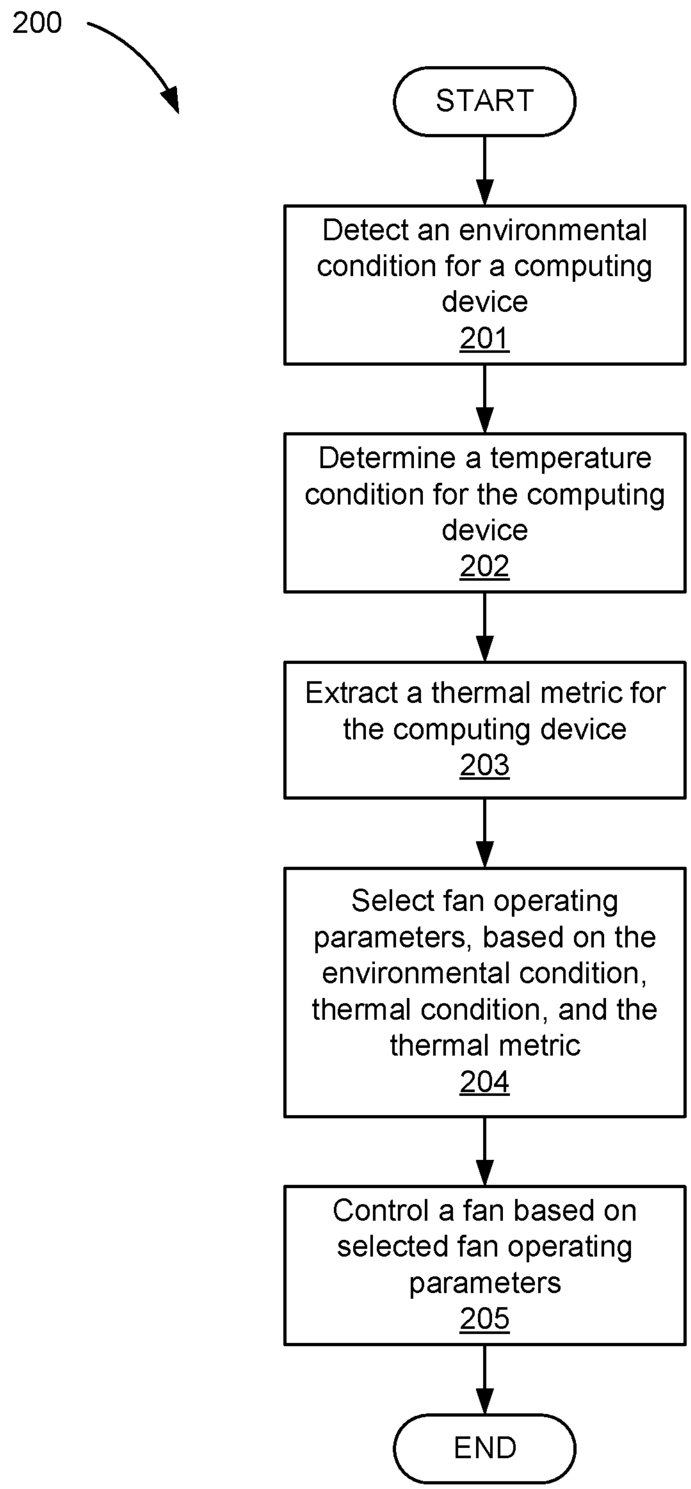
FIG. 2 is a flow chart of a method for adjusting a computing device fan based on environmental conditions and device temperature, according to an example of the principles described herein.

FIG. 2 is a flow chart of a method (200) for adjusting a computing device fan based on environmental conditions and device temperature, according to an example of the principles described herein. According to the method (200), an environmental condition for a computing device is detected (block 201). As described above, the environmental condition may include multiple different conditions including user presence, time of day, and ambient noise. Moreover, as described above the detection (block 201) may not only include a binary decision, i.e., whether there is user presence and whether there is ambient noise, but also may quantitatively describe the environmental condition. For example, the sensor (FIG. 1, 102) may indicate how many users are present in front of a computing device and/or may indicate how loud the ambient noise is. The value associated with each detected (block 201) environmental condition may result in a different fan control. For example, more users in front of a computing device may indicate that a fan may be run at a higher speed as compared to when a single user is in front of the computing device.

A temperature condition for the computing device is determined (block 202). That is a temperature of a component, of multiple components, or in general within a housing of the computing device is determined (block 202).

A thermal metric is extracted (block 203) for the computing device. A thermal metric refers to a thermal condition that is enforced to ensure component reliability and performance. The thermal metrics may be a variety of types. For example, a thermal metric may indicate an amount of time the fan speed is over a predetermined threshold for a period of time. In this example and others, the period of time may vary, and for purposes of illustration in the present specification the period of time may be 24 hours. However, the period of time may be any value including 2 days, 1 week etc. Accordingly, in this example, the system (FIG. 1, 100) may receive such a thermal metric which may be determined by a manufacturer of the component or an operator/administrator of the computing device. In this specific example, the thermal metric may indicate that over the period of time, i.e., 24 hours, the fan can be off for no more than 12 hours. This metric may be based on the fan's cooling ability and indicate that if operated based on this metric, the computing device components would stay within a desired temperature range. As another example, the metric may be an amount of time the fan us under a predetermined threshold for a period of time. In yet another example, the thermal metric may indicate an average, or maximum speed at which the fan can be run.

The above examples describe thermal metrics based on fan operation. In some examples, the thermal metrics may be based on temperature of component(s) of the computing device. For example, the thermal metric may indicate a threshold average temperature of at least one component that is not to be exceeded over the period of time. For example, the component may be a CPU and the thermal metric may indicate a particular value that the average temperature of the CPU should not exceed. In another example, the thermal metric may indicate a maximum temperature of at least one component of the computing device that is not to be exceeded over the period of time.

While specific reference is to an average or maximum temperature of a single component, the average or maximum temperature value may correspond to multiple components. For example, the average or maximum temperature may refer to a temperature within a housing of the computing device. That is, if the average temperature within a housing of the computing device exceeds a threshold value over a period of time, or if a maximum temperature within the housing exceeds a threshold value over the period of time, the controller (FIG. 1, 106) may adjust the fan operation.

While specific reference is made to a few thermal metrics, any variety of thermal metrics may be used. Moreover, while specific reference is made to using just one thermal metric, multiple may be used. For example, fan control may be based on an average temperature of a CPU as well as an average temperature within a housing over a period of time. Whatever the thermal metric may be, it is extracted (block 203) and fan operating parameters are selected (block 204) based on the environmental condition, the temperature condition, and the thermal metric. That is, a temperature condition may be compared against the thermal metric to determine if it is exceeded, based on this comparison and based on the detection of a particular environmental condition, the fan operating parameters may be selected (block 204).

As described above, the sensor (FIG. 1, 102) may detect more than just a binary state of the environmental condition, but may indicate a value associated with the binary condition. Accordingly, selecting (block 204) the fan operating parameters may be more than a binary, on or off, state. That is, the fan parameters may be selected from among multiple fan speeds across a spectrum of fan speeds and from multiple fan runtimes. That is, the fan operating parameter that is selected may be one or both of a fan speed and a fan runtime. Based on the selected fan operating parameters, the controller (FIG. 1, 106) controls (block 205) a fan within the computing device. That is, the controller (FIG. 1, 106) may control at least one of fan speed and fan run time based on the environmental conditions, actual temperature conditions in the computing device, and the thermal metrics.

A few specific examples will now be presented. In a first example, an optical sensor detects (block 201) one user in front of a computing device and it is determined that the computing device CPU has, over a period of 12 hours, an average junction temperature of 90 degrees Celsius. In this example, the system (FIG. 1, 100) may extract from a database a thermal metric that indicates the CPU should be less than 85 degrees over a 12-hour period. Accordingly, the controller (FIG. 1, 106) may increase the minimum fan speed to 2500 rotations per minute (RPM) for the next 12 hours to maintain a CPU temperature less than 80 degrees. In the same example were the user not present, the fan may be run at a speed of 3500 RPM for the 12-hour period. In another example, the controller (FIG. 1, 106) may operate the fan at a speed of 1500 RPM for an hour with a user present and may operate the fan at a speed of 3500 RPM for an hour when a user is not present.

In a second example, if the average junction temperature of the CPU is determined to be 100 degrees Celsius, the controller (FIG. 1, 106) may operate the fan at a speed of 2500 RPM for 5 minutes with the user present as compared to running it at a speed of 3500 RPM for 5 minutes were the user not present. By comparison, the controller (FIG. 1, 106) may operate the fan at a speed of 2500 RPM for 5 minutes with a user present and may operate the fan at a speed of 3500 RPM for 10 minutes when a user is not present. In summary, the controller (FIG. 1, 106) can control various aspects of fan operation including a runtime and a fan speed based on various combinations of detected environmental conditions and actual temperature conditions within the computing device.

Figure 3:
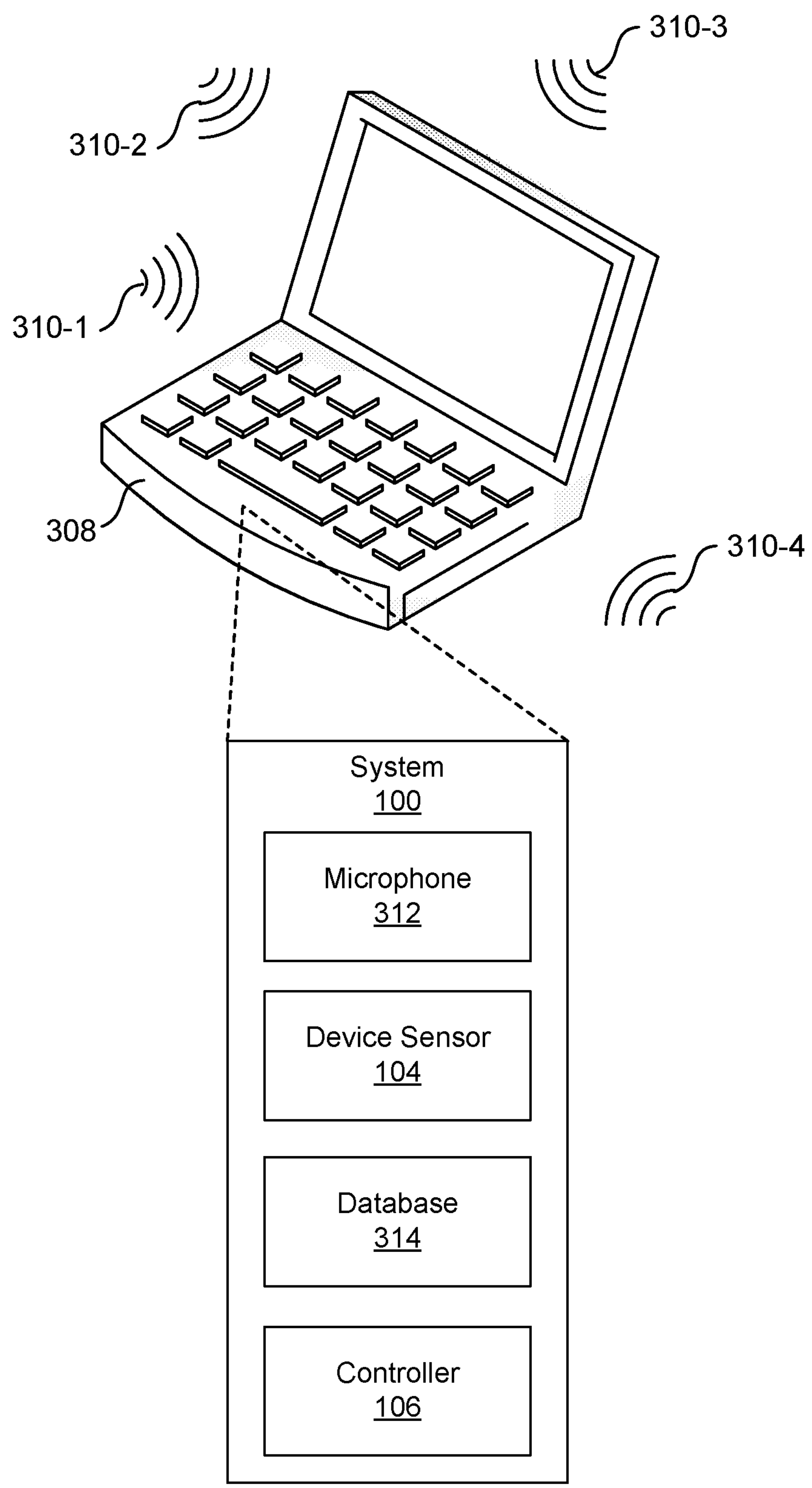
FIG. 3 is a diagram of a computing device with a system for adjusting a computing device fan based on ambient noise and device temperature, according to an example of the principles described herein.

FIG. 3 is a diagram of a computing device (308) with a system (100) for adjusting a computing device (308) fan based on ambient noise and device temperature, according to an example of the principles described herein. As described above, the system (100) may be disposed in any variety of computing devices (308). In the example depicted in FIG. 3, the environmental condition detected is ambient noise, with different sources (310-1, 310-2, 310-3, 310-4) indicated. In this example, the sensor (FIG. 1, 102) is a microphone (312) which is to determine a volume of ambient noise surrounding the computing device (308). Note that in this example, a single microphone (312) is used to determine the ambient noise. In this example, the controller (106), rather than the microphone (314) or a different microphone, may determine a fan noise based on rotational speed of the fan. As described above, the controller (106), based on the output of the microphone (312) and the device sensor (104), adjusts the operation of a fan based on the amount of ambient noise surrounding the computing device (308). For example, for a greater volume of ambient noise, i.e., indicating more sources (310) or a louder source (310), the controller (106) adjusts the fan such that a greater fan noise is allowed as compared to a fan noise based on a lesser volume of ambient noise. That is, if there are more sources (310) of ambient noise, then a greater fan noise may be acceptable whereas if the ambient noise is quieter, a reduced fan noise may be desired.

In the example depicted in FIG. 3, the system (100) also includes a database (314) that stores the thermal metric, in whatever form that may be.

As described above, the control of the fan based on ambient noise may be more than a binary determination. That is, the speed and time that a fan is operated may vary based on the number of ambient sources (312) or the overall volume of the ambient noises.

Figure 4:
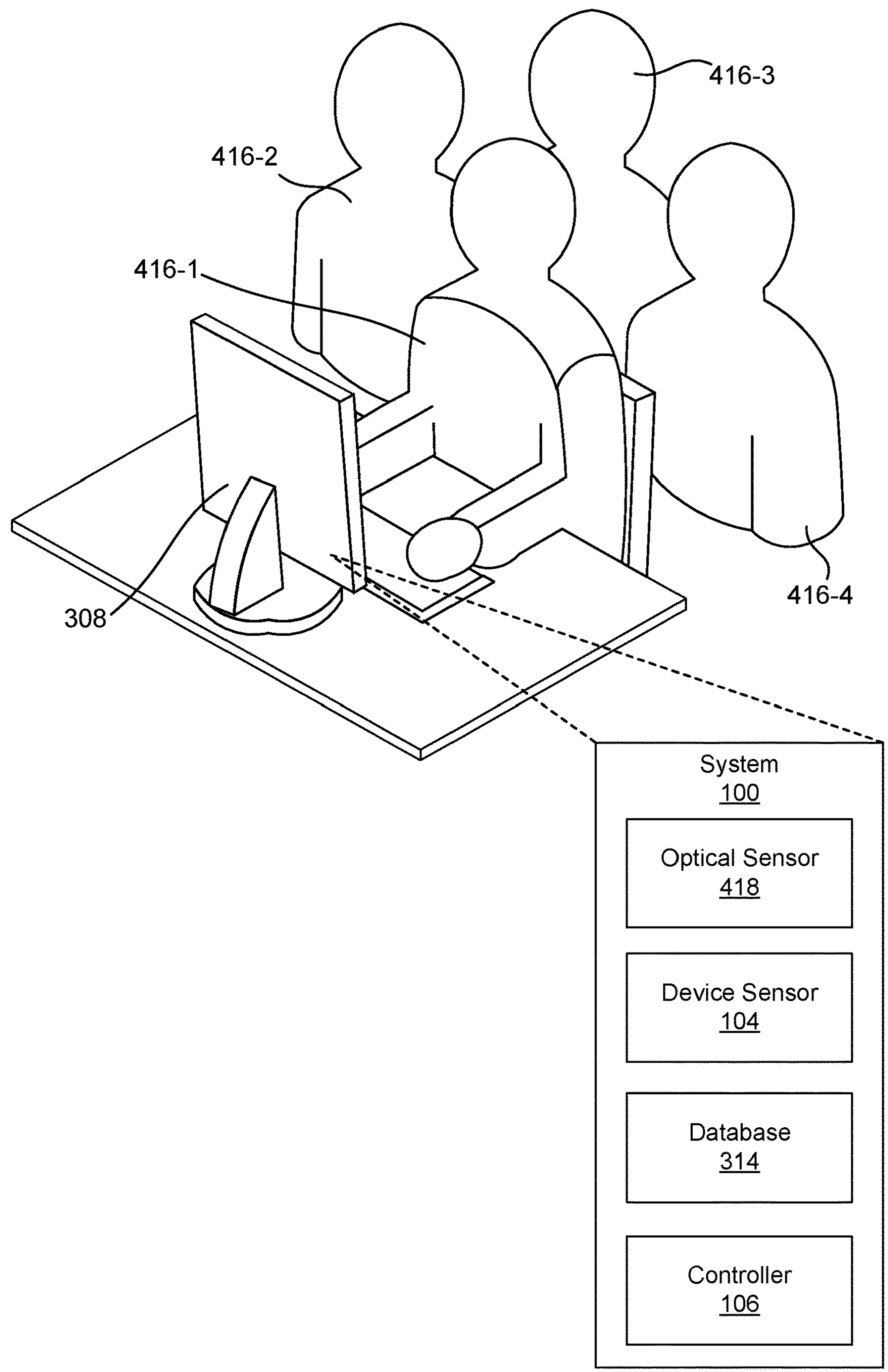
FIG. 4 is a diagram of a computing device with a system for adjusting a computing device fan based on user presence and device temperature, according to an example of the principles described herein.

FIG. 4 is a diagram of a computing device (308) with a system (100) for adjusting a computing device (308) fan based on user presence and device temperature, according to another example of the principles described herein. In the example depicted in FIG. 4, the environmental condition detected is user presence, with multiple users (416-1, 416-2, 416-3, 416-4) indicated. In this example, the sensor (FIG. 1, 102) is an optical sensor (418) which is to determine the presence and quantity of users (416) in front of the computing device (308). As described above, the controller (106), based on the output of the optical sensor (418) and the device sensor (104) adjusts the operation of a fan based on the quantity of users (416) surrounding the computing device (308).

For example, for a larger quantity of users (416), the controller (106) adjusts the fan such that a greater fan noise is allowed as compared to a fan noise allowed based on a smaller quantity of users (416). That is, if there are more users (416), then a greater fan noise may be acceptable whereas if there is a single user (416-1), a reduced fan noise may be desired.

As described above, the control of the fan based on quantity of users (416) may be more than a binary determination. That is, the speed and time that a fan is operated may vary based on the number of users (416) detected.

In another example, the optical sensor (418) detects a persistence of a person in front of the computing device (308) and the controller (106) adjusts the fan based on a detected person in front of the computing device (308). For example, a longer period of time that a person is in front of the computing device (308) results in a lower fan noise as compared to a fan noise based on a person detected in front of the computing device (308) for a shorter period of time.

In addition to determining a presence, and quantity, of users (416) in front of the computing device (308), the optical sensor (418) may determine a proximity of the users (416) to the computing device (308). That is, certain of the users (416) may be farther away, such that any noise generated by their activity would have less obscuring effect of the noise generated by the fan. Accordingly, the controller (106) would not only adjust a fan operation based on the presence and quantity of users (416), but would adjust a fan operation based on a proximity of the at least one user relative to the computing device (308), with users farther away allowing greater fan noise as compared to users that are close to the computing device (308).

Figure 5:
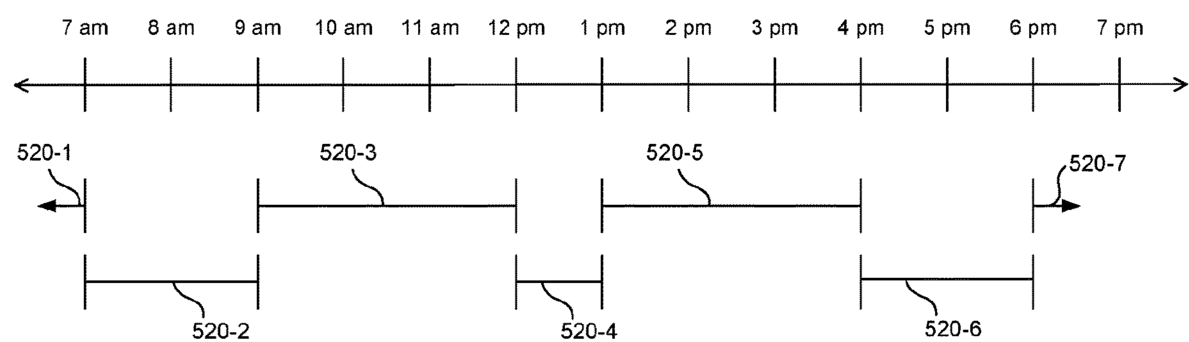
FIG. 5 is a diagram of a timeline for adjusting a computing device fan based on time of day and device temperature, according to an example of the principles described herein.

FIG. 5 is a diagram of a timeline for adjusting a computing device (FIG. 3, 308) fan based on time of day and device temperature, according to an example of the principles described herein. In the example depicted in FIG. 5, the environmental condition detected is a time of day. That is, a sensor (FIG. 1, 102) may extract time information from a calendar. As described above, the controller (FIG. 1, 106) may, based on the output of the calendar and the device sensor (FIG. 1, 104), adjust the operation of a fan based on the time information. For example, during a first period of time a greater fan speed may be available as compared to a fan speed based on a second period of time. As described above, the fan operation may be more than just a binary on or off designation but may have multiple parameters that may be adjusted based on various circumstances. That is a day may be divided up into different periods (520) with different fan operating parameters used during different periods (520).

For example, during a first period (520-1) of time before 7 am, the fan may be run loud and for long periods of time as it is before a particular user shows up for work.

At 7 am a user may show up for work, while other employees may show up at 9 am. During this second period (520-2) of time, the fan may be de-activated as this time of the day may be very quiet and a user may desire for the fan operation to similarly be very quiet. A third period (520-3) of time may start at 9 am and go until 12 pm. During this third period (520-3) of time, the fan may be run a bit louder and for longer periods of time as the increased activity of other employees may make a louder fan not disruptive. During a fourth period (520-4) between 12 pm and 1 pm the fan may be run loudly for an extended period of time as during this period of time a user may be away from their computer for lunch and therefore the increased noise for an extended period of time would not disturb the user.

Again, during a fifth period (520-5) of time, the fan may be run a bit louder and for longer periods of time as the increased activity of other employees may make a louder fan not disruptive. During a sixth period (520-6) of time, the fan may be de-activated as this time of the day may be very quiet and a user may desire for the fan operation to similarly be very quiet. During a seventh period (520-7) after 6 pm, the fan may be run loud and for a long period of time as it is before a particular user shows up for work.

While particular reference is made to a timeline of a single day, the time information from the calendar may indicate other time information that is relied on in controlling fan operation. For example, such things as holidays, weekends, other times when a user may be unavailable, such as a meeting indicated on the user calendar etc.

Figure 6:
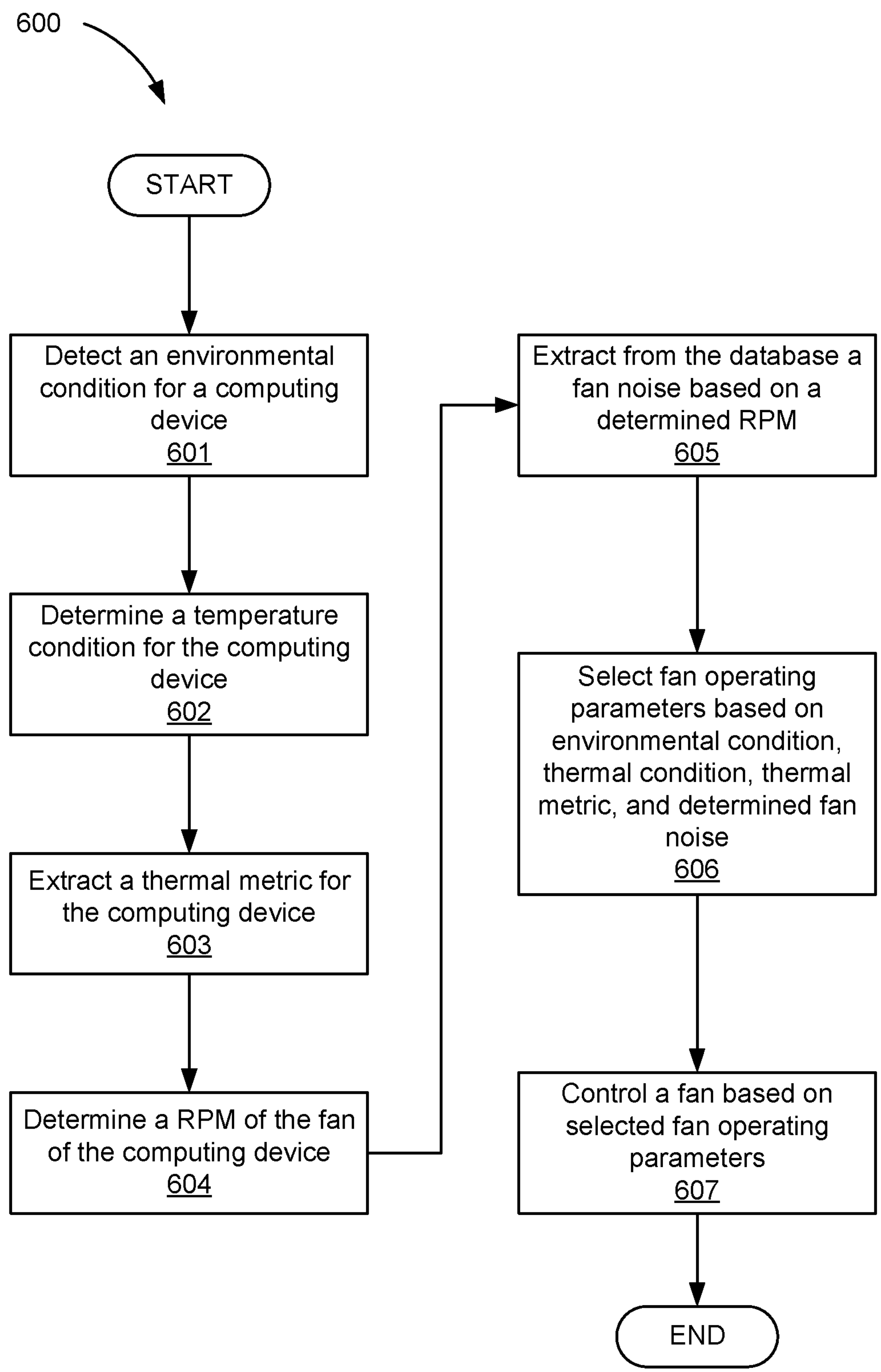
FIG. 6 is a flow chart of a method for adjusting a computing device fan based on environmental conditions and device temperature, according to another example of the principles described herein.

FIG. 6 is a flow chart of a method (600) for adjusting a computing device fan based on environmental conditions and device temperature, according to another example of the principles described herein. According to the method (600), an environmental condition is detected (block 601). This may be performed as described above in connection with FIG. 2.

In some examples, a temperature condition of at least one component within the computing device (FIG. 3, 308) is detected (block 602). That is, as described above the system (FIG. 1, 100) may include a device sensor (FIG. 1, 104) that detects a heat of a single, or multiple, components within the computing device (FIG. 3, 308). Thermal metrics are extracted (block 603) and compared to the temperature conditions to determine how the fan should be controlled. That is, fan operating parameters are further selected based on determined thermal conditions of at least one component. This may be performed as described above in connection with FIG. 2.

In some examples, the operating conditions of a fan may also be used to select (block 606) fan operating parameters. That is, the system (FIG. 1, 100) may determine (block 604) a rotations per minute of the fan of the computing device (FIG. 3, 308). Either from the database (FIG. 3, 314) or another database, a fan noise that maps to the measured RPMs is extracted (block 605). That is, the computing device (FIG. 3, 308) in which the fan is disposed may have a database that, when given the RPMs of the fan can determine an amount of noise generated by the fan. This mapping aids in the adjustment of the fan. That is, the RPM of the fan may be used, in addition to other criteria to select (block 606) fan operating parameters by which the fan is controlled (block 607).

For example, if it is determined that ambient noise is at a particular level, for example 55 decibels (dBs), it may be determined from a mapping between fan noise and RPM, that the fan can be adjusted to operate at 2,000 RPM, which based on the mapping may translate into a noise level of 25 dB, thus not being disruptive based on the ambient environment noise level of 55 dB. Thus, the present method (600) provides a specific example of how control of a fan is based not only on whether or not there is noise, or whether or not there are users present, but based on how loud the ambient noise is and/or how many users are present.

Figure 7:
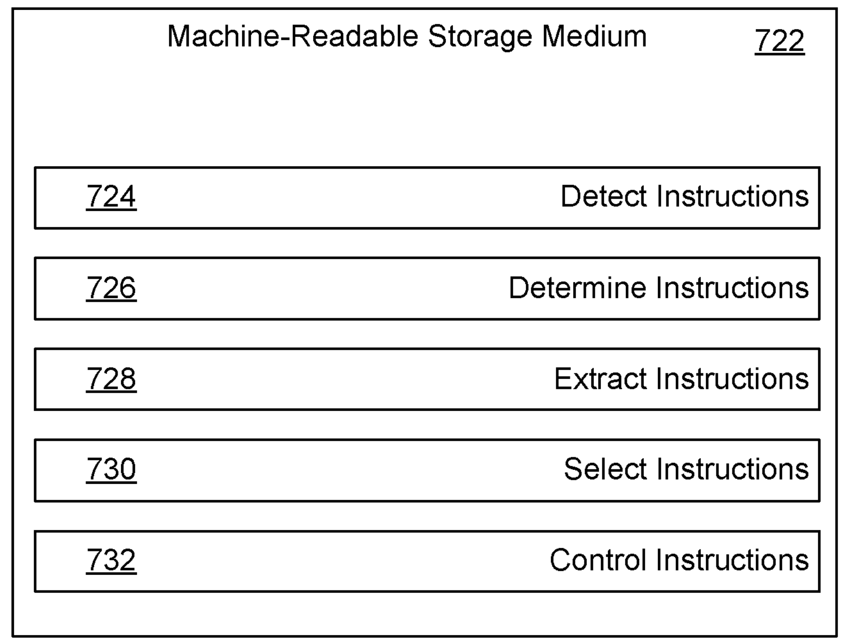
FIG. 7 depicts a non-transitory machine-readable storage medium for adjusting a computing device fan based on environmental conditions and device temperature, according to an example of the principles described herein.

FIG. 7 depicts a non-transitory machine-readable storage medium (722) for adjusting a computing device (FIG. 3, 308) fan based on environmental conditions and thermal metrics, according to an example of the principles described herein. To achieve its desired functionality, a computing system includes various hardware components. Specifically, a computing system includes a processor and a machine-readable storage medium (722). The machine-readable storage medium (722) is communicatively coupled to the processor. The machine-readable storage medium (722) includes a number of instructions (724, 726, 728, 730, 732) for performing a designated function. The machine-readable storage medium (722) causes the processor to execute the designated function of the instructions (724, 726, 728, 730, 732).

Detect instructions (724), when executed by the processor, cause the processor to detect an environmental condition for a computing device (FIG. 3, 308). Determine instructions (726), when executed by the processor, cause the processor to determine a temperature condition within the computing device (FIG. 3, 308). Extract instructions (728), when executed by the processor, may cause the processor to, extract a thermal metric for the computing device (FIG. 3, 308). Select instructions (730), when executed by the processor, may cause the processor to, select, based on the environmental condition, the thermal metric for the computing device, and the temperature condition, fan operating parameters from among multiple fan operating parameters across a spectrum to apply to a fan within the computing device (FIG. 3, 308). Control instructions (732), when executed by the processor, may cause the processor to control the fan based on a selected fan operating parameter.

Figure 8:
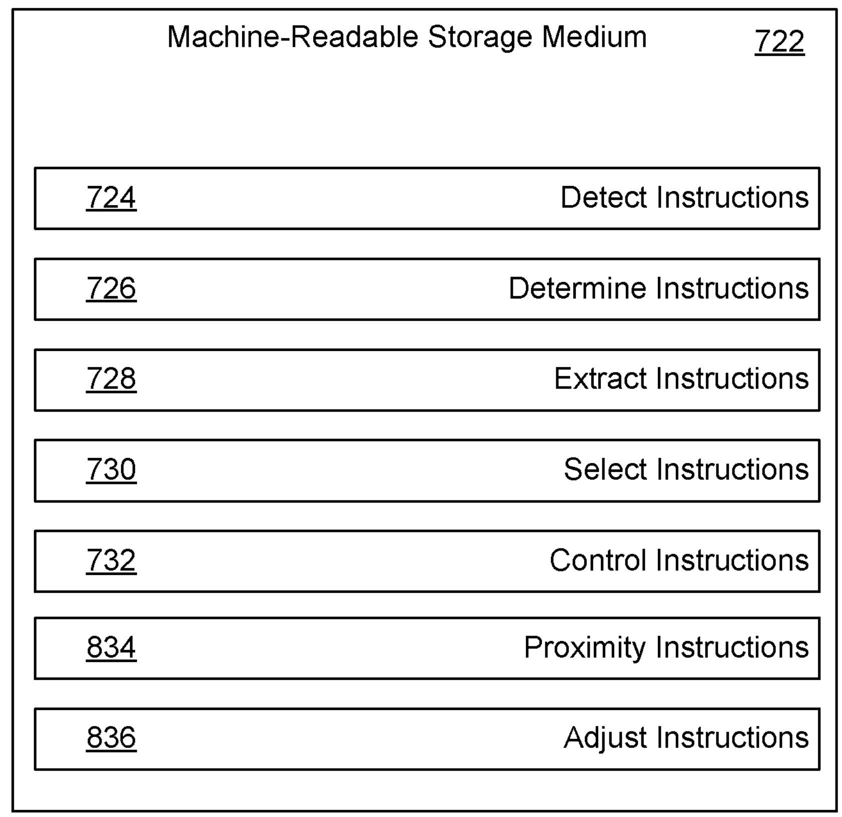
FIG. 8 depicts a non-transitory machine-readable storage medium for adjusting a computing device fan based on environmental conditions and device temperature, according to another example of the principles described herein.

FIG. 8 depicts a non-transitory machine-readable storage medium (722) for adjusting a computing device (FIG. 3, 308) fan based on environmental conditions and thermal metrics, according to another example of the principles described herein. In addition to the instructions (724, 726, 728, 730, 732), described above, the non-transitory machine-readable storage medium (722) depicted in FIG. 8 includes additional instructions. Proximity instructions (834), when executed by the processor, cause the processor to determine a proximity of at least one user relative to the computing device (FIG. 3, 308). Adjust instructions (8736), when executed by the processor, cause the processor to adjust a fan speed based on the proximity of the at least one user relative to the computing device (FIG. 3, 308).

Such systems and methods 1) enhance system reliability by reducing failure rates relating to high component temperatures, 2) enhance customer experience by running fans at a higher speed when a user is not present, or just to a minimal degree when a user is present to maintain predetermined component temperatures. However, it is contemplated that the devices disclosed herein may address other matters and deficiencies in a number of technical areas.

What is claimed is:

1. A system, comprising:
- a sensor to detect an environmental condition for a computing device in which the system is disposed;
- a device sensor to determine a temperature within the computing device;
- a database including one or more thermal metrics for the computing device; and
- a controller to selectively control a fan within the computing device based on the environmental condition, the one or more thermal metrics for the computing device, and the temperature.

2. The system of claim 1, wherein the environmental condition is selected from the group consisting of:
- user presence in front of the computing device;
- a time of day; and
- ambient noise around the computing device.

3. The system of claim 1, wherein the sensor is a microphone to determine a volume of ambient noise surrounding the computing device.

4. The system of claim 3, wherein:
- the controller adjusts the fan based on the volume of ambient noise surrounding the computing device; and
- a larger amount of ambient noise results in a greater fan noise as compared to fan noise based on a smaller amount of ambient noise.

5. The system of claim 1, wherein the sensor is an optical sensor to detect user presence in front of the computing device.

6. The system of claim 5, wherein:
- the optical sensor detects a persistence of a person in front of the computing device;
- the controller adjusts the fan based on a detected person in front of the computing device; and
- a longer period of time that a person is in front of the computing device results in a lower fan noise as compared to a fan noise based on a person detected in front of the computing device for a shorter period of time.

7. The system of claim 1, wherein the sensor extracts time information from a calendar of the computing device.

8. The system of claim 7, wherein:
- the controller adjusts the fan based on the time information; and
- a first period of time results in a greater fan noise as compared to a fan noise based on a second period of time.

9. The system of claim 1, wherein the thermal metric is selected from the group consisting of:
- an amount of time the fan speed is over a predetermined threshold for a period of time;
- an amount of time the fan speed is under a predetermined threshold for a period of time;
- an average temperature of at least one component of the computing device over the period of time;
- a maximum temperature of at least one component of the computing device over the period of time;
- an average temperature within a housing of the computing device; and
- a maximum temperature within the housing of the computing device.

10. The system of claim 1, wherein:
- the sensor is a low power sensor to operate during an idle mode and an active mode; and the controller selectively controls the fan during both the idle mode and the active mode.

11. A method, comprising:
- detecting an environmental condition for a computing device;
- determining a temperature condition for the computing device;
- extracting a thermal metric for the computing device from a database including one or more thermal metrics for the computing device;
- selecting, based on the environmental condition, the temperature condition, and the thermal metric for the computing device, fan operating parameters from among multiple fan operating parameters to apply to a fan within the computing device; and
- controlling the fan based on selected fan operating parameters.

12. The method of claim 11, wherein:
- the method further comprises:
  - determining a rotations per minute (RPM) of the fan;

extracting from a database a fan noise based on a determined RPM of the fan; and selecting fan operating parameter is further based on a determined fan noise.

13. The method of claim 11, wherein the fan operating parameter is selected from the group consisting of a fan speed and a fan runtime.

14. A non-transitory machine-readable storage medium encoded with instructions executable by a processor, the machine-readable storage medium comprising instructions to:

detect an environmental condition for a computing device;

determine a temperature condition within the computing device;

extract a thermal metric for the computing device from a database including one or more thermal metrics for the computing device;

select, based on the environmental condition, the thermal metric for the computing device from the database, and the temperature condition, a fan operating parameter from among multiple fan operating parameters across a spectrum to apply to a fan within the computing device; and control the fan based on a selected fan operating parameter.

15. The non-transitory machine-readable storage medium of claim 14:

further comprising instructions to determine a proximity of at least one user relative to the computing device; and wherein selecting a fan operating parameter to apply to the fan is further based on the proximity of the at least one user relative to the computing device, wherein a closer user results in a lower fan noise as compared to fan noise resulting from a user that is determined to be farther away from the computing device.

* * * * *